United States Patent [19]

Ribka et al.

[11] B 3,924,046
[45] Dec. 2, 1975

[54] DYES AND PIGMENTED ARTICLES WHEREIN THE FIXING AGENT IS A POLYMER BASED ON N-FORMYL-N-ACRYLOYL-METHYLENEDIAMINES

[75] Inventors: Joachim Ribka, Offenbach am Main-Burgel; Steffen Piesch, Oberursel, Taunus; Friedrich Engelhardt, Frankfurt am Main; Gerhard Pfeiffer, Kelkheim, Taunus; Peter Klinke, Oberurse, Taunus; Wolfram Schidlo, Diedenbergen, all of Germany

[73] Assignee: Cassella Farbwerke Mainkur Aktiengesellschaft, Germany

[22] Filed: Oct. 23, 1973

[21] Appl. No.: 408,487

[44] Published under the Trial Voluntary Protest Program on January 28, 1975 as document no. B 408,487.

[30] Foreign Application Priority Data

Oct. 23, 1972 Germany............................ 2251923

[52] U.S. Cl. .................... 428/375; 8/31; 8/100; 8/172; 8/DIG. 7; 260/80.73; 260/89.7 R; 260/561 N; 427/288; 428/264; 428/265; 428/267; 428/392; 428/395; 428/480
[51] Int. Cl.². C08F 16/34; C09B 65/00; D06P 1/52
[58] Field of Search ...... 8/88, 172, 31, 100, DIG. 7; 260/80.73, 89.7, 561 N; 117/161 LN, 161 UN, 161 UA, 138.8 A, 38; 427/288; 428/264, 265, 267, 365, 393, 480, 375, 392, 395

[56] References Cited
UNITED STATES PATENTS

| | | | |
|---|---|---|---|
| 2,478,378 | 8/1949 | Dickey | 260/89.7 R |
| 2,966,481 | 12/1960 | Brace | 260/561 N |
| 3,178,385 | 4/1965 | Dinges | 260/89.7 R |
| 3,467,642 | 9/1969 | Horiguchi | 8/4 X |
| 3,694,506 | 9/1972 | Franco | 260/561 N |

*Primary Examiner*—Mayer Weinblatt
*Assistant Examiner*—Dennis L. Albrecht
*Attorney, Agent, or Firm*—Connolly and Hutz

[57] ABSTRACT

A dyed or pigmented fiber or film having the dye or pigment fixed thereto by a fixing agent, said fixing agent being a linear addition polymer containing at least 0.2 percent by weight of a monomer of the formula

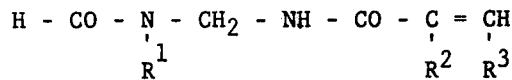

which has been thermally crosslinked, $R^1$, $R^2$ and $R^3$ being hydrogen or alkyl having 1 to 5 carbon atoms, said fibers or films having outstanding fastness to rubbing, washing and chemical cleaning.

6 Claims, No Drawings

DYES AND PIGMENTED ARTICLES WHEREIN THE FIXING AGENT IS A POLYMER BASED ON N-FORMYL-N-ACRYLOYL-METHYLENEDIAMINES

It is known that dyes and pigments may be fixed to fibers and films when they are applied from printing pastes or pad liquors together with fixing agents onto the substrates to be printed or dyed and the fixing agent is then converted by chemical reaction into water-insoluble films. The film-forming substances are polymerization, polycondensation or polyaddition products which are capable of forming aqueous dispersions or are water-soluble. Good fastness properties of the dyes and prints are obtained when the above-named fixing agents contain reactive groups such as carboxyl, carbonamide, aldehyde or hydroxyl which enable cross-linking of the synthetic resin film on the substrate. These groupings may then react with additional polyfunctional crosslinking agents such as water-soluble basic polymers or urea, formaldehyde or melamine resins to crosslinked insoluble synthetic resin films.

Particularly useful fixing agents are those which cross-link both with themselves, as well as with a substrate such as polymers containing acrylic or methacrylic acid amide as the crosslinking constituent, the amide group being substituted by methylol, methylol alkyl ether or methylol ester groups. Comonomers for emulsion polymerization include acrylic acid esters, methacrylic acid esters, styrene and its derivatives, acrylonitrile, vinyl esters, vinyl ethers, vinylidene chloride, acrylic acid, methacrylic acid, acrylamide, methacrylamide and diolefins such as butadiene. The identity and amount of comonomers are determined by the requirements with respect to plasticity, softening point, elasticity, light ageing, weathering and solvent stability of the synthetic resin film. Generally, fixing of such self-crosslinking mixed polymers is accomplished by dry heat or superheated steam in an acid medium.

Althouth dispersions of film-forming substances may fully meet the requirements of dyeing and printing upon appropriate selection of the monomers, the water-soluble form of the fixing agent prior to fixing offers technical procedural advantages since there is no danger of coating the rollers, plugging screen printing patterns and roller engravings and hardening printing backing (followers, printers' blankets). Additionally, improper dyeing or printing may be eliminated from the substrate prior to crosslinking by washing. Such systems are described in German Patents 971,871, 1,209,097 and 1,134,963. The first two patents claim alkali-soluble condensation resins of polyvalent acids and polyvalent alcohols containing aqueous solutions of reactive carboxyl group as the binding agents and polyfunctional products, which are obtained by the reaction of at least 2 mols $\alpha,\beta$-alkyleneimine with phosphorous oxyhalides, cyanuric halides or terephthalic acid halides as the fixing agents. German Patent 1,134,963 discloses partially or entirely saponified graft polymers of vinyl esters on polyalkylene glycol as the pigment binding agent and fully or partially etherified aminoplast precondensates as the fixing agents. The fixing process in these German patents takes place after an intermediate drying and involves dry heat treatment in an acid medium or in the case of the first two German patents, a neutral or acid steaming process.

The present invention is based on the discovery of certain fixing agents which avoid the disadvantages of the prior art fixing agents and is directed to a dyed or pigmented fiber or film having the dye or pigment fixed thereto by a fixing agent which is a linear addition polymer containing at least 0.2 percent by weight of a monomer of the formula

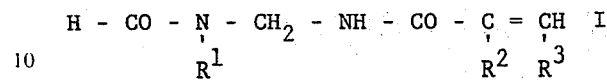

which has been thermally crosslinked after application to the fiber or film, $R^1$, $R^2$ and $R^3$ being hydrogen or alkyl having 1 to 5 carbon atoms. Preferably, $R^2$ and $R^3$ are hydrogen or methyl.

The compounds of formula I are prepared by reacting a substituted formamide of formula II with an amide of formula III under conditions which produce water as by-product and in accordance with the equation:

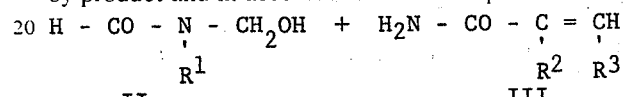

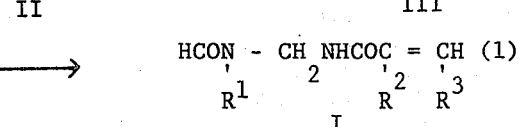

The aforesaid reaction may be carried out, depending on the reactivity of the reactants, at room temperature (20°C.) or at elevated temperature. Normally, temperatures of 70 to 130°C. are sufficient. Although the reaction may be carried out in the absence of solvent, it is preferred to dissolve the reactants in a suitable reaction inert solvent. Such solvents include halogenated hydrocarbons such as methylene chloride, chloroform, ethylene chloride and trichloroethylene; hydrocarbons such as benzene, toluene and xylene; ethers such as tetrahydrofuran and dioxan; dimethylformamide and alcohols such as tertiary butanol.

The addition of an acid catalyst generally promotes the reaction rate. Suitable acid catalysts include proton acids or Lewis acids, i.e., inorganic acids such as hydrochloric, sulfuric, phosphoric and nitric acids; organic carboxylic acids such as formic, acetic and trichloroacetic acids; sulfonic acids such as p-toluene sulfonic acid; zinc nitrate; zinc chloride; boron trifluoride; boron trifluoride etherate; ammonium chloride and ammonium nitrate. Based on a unimolar conversion, 0.1 to 5 g of the acid catalyst are added.

It is appropriate to add a polymerization inhibitor to prevent any possibility of a reaction at the double bond. Such inhibitors include phenothiazine, hydroquinone, benzocatechol, resorcinol and the monomethyl ether of hydroquinone in an amount of about 0.1 to 2 g, based on unimolar conversion.

The reaction mixture is agitated for 1 to 15 hours, the time depending upon the reaction temperature and other factors. By-product water may be distilled off under vacuum (when working without solvent) or azeotropically (when working with solvent). However, distillation of the by-product water is not required.

If the reaction is carried out in the absence of solvent, i.e., in the melt, the reaction product, in most instances, may be further utilized immediately. When employing a solvent, the reaction product, often precipitates as crystals. However, isolated crude product may often be used without recrystallization.

The formamide reactants of formula II are readily prepared from a formamide of formula IV and formaldehyde of formula V according to the equation:

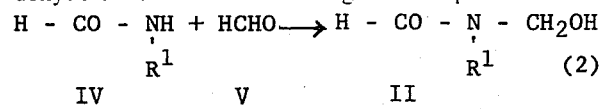

IV      V      II

In lieu of formaldehyde in the foregoing reaction, paraformaldehyde, trioxane and aqueous formaldehyde may be employed.

Reaction (2) is carried out at elevated temperatures of 50–150°C. at a reactant molar ratio of 1:1. Agitation until a homogeneous solution or a melt results is employed. Suitable solvents for the reaction include those discussed above in connection with reaction (1). Moreover, an excess of substituted formamide of formula IV may be utilized as solvent in the event this formamide melts at the reaction temperature. The pH of the solution or reaction melt should be between 5 and 9.

It is not necessary that the reaction product of formula II be isolated on termination of reaction (2). Instead, it may be reacted immediately following reaction (1) and the addition of the compound of formula III, as well as the addition of any employed solvent, catalyst or polymerization inhibitor.

The homopolymerization of the compounds of formula I or the copolymerization thereof with one or more copolymerizable olefinically unsaturated monomers may be carried out in bulk, in solution or in emulsion without crosslinking of the resulting polymer. The monomers of formula I for copolymerization purposes are employed in an amount of about 0.2 to 50 percent by weight, based on total monomers, and preferably in an amount of 0.5 to 30 percent by weight.

As previously indicated, all copolymerizable olefinically unsaturated monomers may be employed for the preparation of the copolymers of the instant invention. Typical examples of these include vinyl benzenes, $\alpha$, $\beta$-unsaturated mono- and dicarboxylic acids, amides, nitriles and esters of said acids, monoolefins, conjugated diolefins and esters of vinyl alcohols.

Examples of vinyl benzenes include styrene, $\alpha$-methylstyrene, vinyl toluene, styrene sulfonic acid and p-chlorostyrene.

Examples of $\alpha$, $\beta$-unsaturated mono- and dicarboxylic acids include acrylic acid, methacrylic acid, crotonic acid, maleic acid and fumaric acid. Examples of the stated derivatives of the aforesaid acids include acrylic and methacrylic acid amide, acrylic and methacrylic acid nitrile, esters of acrylic and methacrylic acid. The preferred esterifying alcohols include alkanols having 1 to 18 carbon atoms and cycloalkanols having 3 to 8 carbon atoms such as methyl, ethyl, propyl, isopropyl, isobutyl, hexyl, octyl and stearyl alcohols, glycidol and cyclohexanol. Additionally, benzyl alcohol and phenol may be used for esterifying purposes.

Another group of useful esters of the stated $\alpha$, $\beta$-unsaturated carboxylic acids include monoesters wherein the esterifying alcohol is a difunctional saturated alcohol such as 2-hydroxyethylmethacrylate, 2-hydroxypropylmethacrylate, 4-hydroxybutylmethacrylate, 2-hydroxyethylacrylate, 2-hydroxypropylacrylate, 4-hydroxybutylacrylate, as well as the corresponding diesters.

Typical olefins and conjugated diolefins include, for example, ethylene, propylene, butadiene, isoprene and dimethylbutadiene. Furthermore, unsaturated ethers, ketones and halogen compounds such as vinyl ether, vinyl ketone, vinyl halide, vinylidene chloride and chloroprene are examples of other copolymerizable olefinically unsaturated monomers.

Preferred esters of vinyl alcohols include vinyl acetate and vinyl propionate. Additional comonomers include methylolamide, acrylamide, methacrylamide, their Mannich bases and methylol ether, vinyl, allyl and methallyl sulfonic acids, basic esters of acrylic and methacrylic acids such as methacrylic acid dimethylaminoethyl ester and the quaternization products thereof, diallylammonium compounds and vinyl pyridine. The copolymers may, of course, contain one or more of the copolymerizable olefinically unsaturated monomers.

Polymerization is carried out in known fashion in solution, in aqueous emulsion or dispersion or in substance (bulk) at temperatures of between 10° and 80°C., preferably between 40° and 75°C. at normal or elevated pressure. The polymerization can be carried out in the presence of all free radical yielding substances, including, for example, organic per compounds such as acyl peroxides, e.g., benzoyl peroxide, alkyl hydroperoxides such as tertiary butyl hydroperoxide; cumene hydroperoxide; p-methane hydroperoxide; dialkyl peroxides such as di-tert. butyl hydroperoxide and inorganic per compounds such as potassium, sodium and ammonium persulfate, hydrogen peroxide and percarbonates.

It is convenient to use the organic and inorganic per compounds in combination with reducing agents in the known manner. Suitable reducing agents include, for example, sodium pyrosulfite, sodium bisulfite and rongalite. Particularly advantageous results are achieved with Mannich adducts of sulfinic acids, aldehydes and amino compounds as described in German Patent 1,301,566.

Molecular weight regulating agents, for example, alcohols, alkyl mercaptans and certain halogenated compounds may be present during polymerization.

Copolymerization in aqueous emulsion occurs most suitably with the addition of emulsifiers such as ethoxylated fatty alcohols or phenols (ethoxylated octylphenol or oleylalcohol), or of sulfated or sulfonated fatty alcohols.

The linear addition polymers are extraordinarily stable on storage at normal temperature in the pH range of 2 to 9 and crosslink on their own upon heating to temperatures below 100°C. At temperatures above 50°C., crosslinking may be accelerated by the addition of acids or compounds which yield acid by-products or by the addition of alkaline compounds. The uncrosslinked polymers having a high content of acrylic and/or methacrylic acid are capable of yielding completely clear solutions which may be diluted as desired with water.

The dyeing and printing with the fixing agents of the present invention is carried out in accordance with standard known operating procedures as is fully illustrated by the working examples appearing hereinafter.

In order to obtain prints which may be used immediately without after-treatment, thickening additives are advantageously used which are prepared by emulsifying a solution of the thickening agent in a water-insoluble or sparingly water-soluble organic solvent in water in such a manner that the solvent solution constitutes the inner phase of the emulsion. By the use of such known oil-in-water emulsions, the advantages of purely aqueous printed colors or dye liquors such as dilutability with water, easy washing of machine parts, reduced fire hazard as compared to water-in-oil emulsions, etc., are maintained without having to encounter the disadvantages of employing thickening agents capable of swelling, such disadvantages including stiffness of feel, poor washing and rubbing fastness, decreased brilliance and lower yield value. Mixtures of thickeners capable of swelling or oil-in-water emulsions however may, of course, be used. Typical examples of the thickening agents which may be optionally used in the present invention include alginates, mucilage, carob bean flour, dextrin, cellulose ethers of carboxylic acids, salts of polyacrylic acid, polyvinyl alcohol and others.

For the preparation of highly viscous, flowable oil-in-water emulsions, hydrocarbons such as gasoline, Diesel oil, toluene, xylene, etc., as well as chlorinated hydrocarbons and turpentine are particularly suitable. The boiling point of the selected solvent should preferably be below 70°C. The upper boiling range is advantageously measured in such a manner that the solvents volatilize completely during the drying of the dyed or pigmented articles. The preparation of the oil-in-water emulsions is carried out in known manner by stirring the organic solvent solution into an aqueous emulsifying containing solution, for example, an aqueous solution of albuminous substance or an oxyethylated compound.

All inorganic and organic materials which qualify as pigments and dyes are useful for producing the products of the present invention. Typical examples of these include titanium dioxide, ferric hydroxide, metal powders such as aluminum and bronze powder, carbon black, ultramarine blue and other oxidic or sulfidic inorganic pigments, as well as organic pigments such as azo pigments, quinoline and indigo vat dyes, phthalocyanine dyestuffs, bisoxazine dyestuffs, perylene tetracarboxylic acid dyestuffs and quinacridone dyestuffs as described in U.S. Pat. Nos. 2,844,484, 2,844,581 and 2,844,485. By "azo pigments" is meant azo dyestuffs which are obtained by the coupling of diazo or tetraazo compounds of amines free of groups having water-soluble properties with coupling constituents customary in pigment chemistry. Typical coupling constituents include, for example, naphthols, oxynaphthoic acid arylide, pyrazolone, acetoacetic acid arylide and the like. If these dyestuffs contain sulfonic acid or carboxylic acid groups, they can be used in the form of lacquers prepared with alkali earth salts.

By fibers as used herein is meant the individual fiber itself, as well as textile fabrics, knitted fabrics, fiber fleeces and the like made from such fibers. By films is meant by relatively thin smooth surfaced article. All fibers and films which are capable of dyeing or pigmenting are useful in the instant invention. Typical examples thereof include native and regenerated cellulose, acetylated cellulose, wools, silk, synthetic fibers such as polyamide, polyester, polyacrylonitrile, polyvinyl chloride, glass, asbestos, paper and cardboard.

Pigment or dyestuff, the polymer dispersion or solution based on the monomer of formula I and any auxiliary agents which are used such as thickening agents, emulsion or dispersion agents, acid or acid-releasing or alkaline crosslinking agents are incorporated in the printing paste or dye liquor and pressed on the material to be printed or padded onto the material to be colored. Subsequently, a short heat treatment crosslinks the aforesaid polymer and thereby fixes the pigment or dye on the material to be dyed or printed. The heat treatment may be accomplished with dry heat or with steam. Generally, treating times of 1 to 10 minutes at temperatures of 100° to 180°C. suffice, the length of the treating time being reduced with increased temperature. The dyeings and prints prepared in accordance with the present invention are distinguished by superior rubbing fastness, washing fastness and chemical cleaning fastness. Since fixing in accordance with the present invention is accelerated under both acid, as well as alkaline conditions, technical advantages and simplifications in application result. For example, alkaline fixing may be employed when using reactive dyestuffs and pigments.

The following examples illustrate the present invention. Percentage figures pertain to percent by weight.

EXAMPLE 1

Into a flask equipped with agitator, gas inlet pipe and bottom valve are introduced 400 ml deionized water. While passing through a weak nitrogen stream, 25 g Mersolat H (serves as emulsifier) are dissolved and then 336 g acrylic acid butyl ester, 20 g acrylonitrile and 20 g of a compound of the formula $$H - CO - NH - CH_2 - NH - CO - CH = CH_2$$

are emulsified for about 30 minutes. Then about 150 ml of the monomer emulsion are withdrawn through the bottom valve into a flask, which is equipped with an agitator, thermometer, 2 dropping funnels, gas inlet pipe, feed for the monomer emulsion and water bath. The temperature of the monomer emulsion in the reaction flask, through which a weak nitrogen stream is conducted, is brought to 40°C (water bath) and then from separate dropping funnels is begun dropwise addition of 4.0 g ammonium peroxydisulfate dissolved in 50 ml water and 1.0 g sodium pyrosulfite dissolved in 50 ml water.

Polymerization begins in a short time, the temperature of the reaction mixture rising to 46–48°C. The remaining monomer emulsion and catalyst solutions are allowed to run in during a period of 2 hours in such a manner that a temperature of 48°C is not exceeded. Upon completion of polymerization, agitating is continued for 1 hour at 50°C.

The resulting dispersion of the uncrosslinked polymer has a solids content (resin content) of 38.7 percent by weight and a pH value of 2.4. A polymer film dried at 95°C consists of the crosslinked polymer and is flexible, insoluble in water, trichloroethylene and dimethylformamide.

A cotton fabric is padded with a pad liquor consisting of:

20 Parts by weight per liter of a 32 percent aqueous dispersion of copper phthalocyanine
100 pbw/l of the above-described polymer dispersion
20 pbw/l of an aqueous solution of ammonium salt of a polyacrylic acid and
15 pbw/l of an organic, acid-releasing compound (hydrochloride of an aminoalcohol)

with a liquor absorption of about 60 percent. Upon drying, the dye is fixed by dry heating at 170°C for 2 minutes. There is obtained a strong blue dyeing having very good fastness properties.

The necessary N-acryloyl-N'-formylmethylenediamine may be prepared by agitating 450 g formamide and 300 g paraformaldehyde (10 mol each) for one hour at 110°C to obtain a clear melt of N-methylolformamide, cooling it to 40°C and stirring while adding 2 l cyclohexane, 30 g hydroquinone monomethylether, 710 g acrylamide and 75 ml concentrated hydrochloric acid. Then the reaction water is distilled off azeotropically and the residue, while hot, is poured into a separating funnel and the lower layer is separated. It consists of N-formyl-N'-acryloyl-methylenediamine.

Yield: 1250 g (97 percent of theory) practically free of methylene bis-acrylamide. After standing, the substance crystallizes. Melting point 128°C (decomposition).

If in the above example the cyclohexane is substituted by the same quantity of benzene and the procedure otherwise is as described, equally good results are obtained. In place of hydrochloric acid, there may also be used phosphoric acid, p-toluene sulfonic acid, borontrifluoride etherate, sulfuric acid, trifluoroacetic acid, trichloroacetic acid or the like.

EXAMPLE 2

In the polymerization apparatus described in Example 1, a monomer emulsion having the composition given below is polymerized at 50°–53°C:
- 144 g vinyl acetate
- 174 g acrylic acid butylester
- 80 g acrylic acid ethylhexylester
- 4 g methacrylic acid
- 20 g of a compound of the formula
  HCO-NH-CH$_2$-NH-CO-C=CH$_2$ (m.p. 108°C)
    |
    CH$_3$
- 500 ml water (deionized)
- 90 g Abex 18 S 4.8 g Ammonium peroxydisulfate as well as 1.5 g sodium pyrosulfite, dissolved in 500 ml water each, were employed as the catalyst. There is obtained a homogeneous polymer dispersion with a polymer content of 35.8 percent. The polymer film, dried at 100°C, is insoluble in water and in organic solvents.

Applied to a mixed fabric consisting of polyester and cotton by roller printing is a printing paste of the following composition:
- 50 pbw of a 42 percent aqueous dispersion of 5,5'-dichloro-7,7'-dimethylthioindigo
- 150 pbw of the above-described 35.8 percent mixed polymer dispersion
- 780 pbw of an oil-in-water emulsion having the composition given below
- 20 pbw of a 33 percent aqueous solution of diammonium phosphate
- 1000 parts by weight The oil-in-water emulsion is obtained if a solution, consisting of 8 pbw of the reaction product of 13 mol ethylene oxide with 1 mol triisobutylphenol, 50 pbw of a 3 percent aqueous solution of a carboxymethylcellulose or of an alginate and 62 pbw water and 880 pbw heavy gasoline having a boiling range of 180°–230°C is emulsified.

Fixing occurs after drying by heating to 170°C for 2 minutes. The vigorous, red-violet print is distinguished by a very soft feel and very good fastness properties.

EXAMPLE 3

In the polymerization apparatus described in Example 1, a monomer emulsion, having the composition given below, is polymerized for 4 hours at 40°–42°C:
- 160 g vinyl acetate
- 200 g acrylic acid butylester
- 50 g of a compound of the formula HCO—NH—CH$_2$—NH—CO—CH=CH—CH$_3$ (b.p. 164°C (decomposition))
- 500 ml water (deionized)
- 10 g olefin sulfonate
- 10 g Triton ×100 (emulsifier)
- 5 g lauryl sulfate.

As catalyst components are used 4.2 g sodium peroxydisulfate, dissolved in 50 ml water and 2.0 g of a compound of the formula

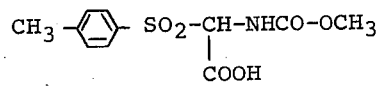

dissolved in 50 ml 2N sodium hydroxide.

The polymer dispersion thus obtained has a polymer content of 39.6 percent and a pH value of 2.8. The flexible polymer film dried at 110°C is insoluble in water and organic solvents.

A polyamide-6 textile is printed by roller printing with the following paste:
- 80 pbw of a 30 percent aqueous carbon black dispersion
- 200 pbw of the above-described 39.6 percent polymer dispersion
- 700 pbw of the emulsion thickening agent of Example 2
- 20 pbw of a 33 percent aqueous diammonium phosphate solution
- 1,000 parts by weight After drying and one-minute heating to 185°C there results a black print with soft feel and very good fastness properties.

The 1-methyl-hydrogen-3-(p-tolylsulfonyl)-2-aza-succinate used for the preparation of the polymer as the reducing catalyst constituent is prepared as follows: 7.5 methylcarbamate, 17.8 g p-toluene sulfinic acid sodium salt, 26 g glyoxylic acid (40 percent solution in water), 100 ml water and 20 g formic acid (85 percent) are agitated 5 hours at 40°C. After 2 hours, the solution becomes turbid as a result of initial crystallization of the reaction product. Upon completion of the reaction, the product is cooled to 10°C, recovered and washed with ice water. After drying over phosphoropentoxide, there are obtained 29.5 g (76 percent of theory) 1-methyl-hydrogen-3-(p-tolylsulfonyl)-2-aza-succinate with a melting point of 101°C.

EXAMPLE 4

A monomer emulsion having the composition given below, is polymerized for 4 hours at 50°C in an autoclave of VA steel:
- 150 g acrylonitrile
- 100 g butadiene
- 15 g methacrylic acid
- 5 g of a compound of the formula
  HCO-N-CH$_2$-NH-CO-CH=CH$_2$ (m.p. 110°C)
    |
    CH$_3$
- 700 ml water (deionized)
- 20 g Triton ×200
- 10 g olefin sulfate
- 0.5 g dodecylmarcaptan
- 2 g sodium peroxydisulfate
- 1 g of a compound of the formula

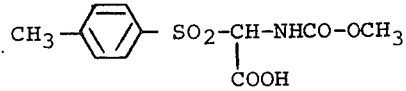

as the catalyst.

The homogeneous polymer dispersion obtained has a polymer content of 25.7 percent. The soft, flexible polymer film dried at 95°C, is insoluble in water and in organic solvents.

A polyamide-6 fabric is padded on a pad with an aqueous bath containing per liter:
- 20 pbw of a 46 percent aqueous dispersion of chlorinated copper phthalocyanine
- 100 pbw of the above-described polymer dispersion
- 20 pbw of an aqueous solution of the sodium salt of polyacrylic acid and
- 15 pbw of an organic acid-liberating compound.

The fabric is squeezed to about a 50 percent liquor absorption, dried at 100°C and subjected to a heat treatment for 2 minutes at 170°C. There is obtained a green pigment coloration with very good fastness properties and soft feel.

EXAMPLE 5

A monomer solution having the composition given below, is polymerized at 62°C for 1 hour in the polymerization apparatus described in Example 1:
- 200 g acrylic acid butyl ester
- 100 g acrylonitrile
- 30 g acrylamide
- 60 g acrylic acid
- 5 g of a compound of the formula $$HCO-NH-CH_2-NH-CO-CH=CH_2$$

- 700 ml water (deionized)
- 300 ml methanol
- 2 g ammonium peroxydisulfate.

After polymerization is complete, stirring is continued for 1 hour at 60°C. Upon cooling to 50°C, 100 ml 15 percent aqueous ammonia solution are added. The infinitely water-soluble polymer solution obtained has a polymer content of 27.3 percent. The polymer film dried at 100°C is insoluble in water, dilute alkali and organic solvents.

There is applied in the customary manner to a cotton fabric by roller printing a paste of the following composition:
- 50 pbw of a 46 percent aqueous dispersion of chlorinated copper phthalocyanine
- 180 pbw of the above-described 27.3 percent water-soluble polymer solution
- 750 pbw of the oil-in-water emulsion described in Example 2
- 20 pbw of an organic, acid-liberating compound (hydrochloride of an aminoalcohol)
- 1000 parts by weight The green pigment print has good rubbing and scrubbing fastness and is also solvent-stable after drying and 2-minute fixing at 170°C in a hot-air fixing apparatus.

A padding liquor is prepared from the following constituents:
- 20 pbw/l of a 38 percent aqueous dispersion of the coupling product of 2 mol acetoacetic acid-2, 5-dimethoxy-4-chloroaniline and 1 mol tetraazotized 2,2'-dichlorobenzidine
- 100 pbw/l of the above 27.3 percent water-soluble polymer solution
- 20 pbw/l of an aqueous solution of the sodium salt of polyacrylic acid and
- 20 pbw/l of an organic, acid-liberating compound (hydrochloride of an aminoalcohol).

A cotton fabric is squeezed with this bath to a 60 percent liquor absorption and upon drying is subjected to a heat treatment at 170°C for 2 minutes. The yellow pigment coloration obtained has a good feel and very good fastness properties.

EXAMPLE 6

In the apparatus described in Example 1, a monomer emulsion, consisting of 90 percent ethylacrylate, 5 percent acrylonitrile and 5 percent of the compound of the formula $$H-CO-NH-CH_2-NH-CO-CH=CH_2$$

is polymerized in accordance with the procedure given in Example 1. The polymer dispersion has a solids content of 38.5 percent.

A cotton fabric is padded with a padding liquor consisting of:
- 20 pbw/l of a 46 percent aqueous dispersion of chlorinated copper phthalocyanine
- 100 pbw/l of the above-described polymer dispersion
- 30 pbw of a 33 percent aqueous solution of potassium carbonate with a liquor absorption of about 65 percent. Upon drying, the dye is fixed by a 10-minute vapor process at 100°–102°C. Obtained is a green pigment coloration with good fastness properties and soft feel.

EXAMPLE 7

In the polymerization apparatus described in Example 1, a monomer emulsion is polymerized in accordance with the data in Example 2. There are added as crosslinking constituent to the monomer emulsion, 20 g of a compound of the formula $$HCO-NH-CH_2-NH-CO-C=CH_2$$
$$\phantom{HCO-NH-CH_2-NH-CO-}|$$
$$\phantom{HCO-NH-CH_2-NH-CO-}CH_3$$

After reaction, a polymer dispersion results with a solids content of 39.6 percent.

A polyester and cotton mixed fabric (67:33) was padded with a padding liquor consisting of:
- 20 pbw/l of a 36 percent aqueous dispersion of the coupling product of 2 mol 2,5-dimethoxy-4-chloroacetate acetic acid aniline and 1 mol 2,2-dichlorobenzidine
- 100 pbw/l of the above-described polymer dispersion and
- 30 pbw/l of a 33 percent aqueous solution of sodium acetate with a liquor absorption of about 60 percent.

Upon drying, the dye is fixed at 180°C by 2-minute steaming. There results a yellow pigment coloration with good fastness properties and unobjectionable feel.

EXAMPLE 8

In the polymerization apparatus described in Example 1, a monomer emulsion of the following composition is polymerized for 4 hours at 45°C.:
- 190 g acrylic acid butyl ester
- 100 g acrylic acid ethyl ester
- 150 g styrene
- 25 g methacrylic acid hydroxyethylester
- 10 g itaconic acid
- 20 g of a compound of the formula $$HCO-N-CH_2-NH-CO-CH=CH_2$$
$$\phantom{HCO-}|$$
$$\phantom{HCO-}CH_3$$

700 ml water (deionized)
20 g Triton X300
10 g Mersolat H 5 g ARKOPAL N 130 as well as 2 g ammonium peroxydisulfate and
1 g sodium pyrosulfite as the catalyst components.

The residue-free polymer dispersion which is obtained has a solids content of 40 percent. The film dried at 115°C, is flexible as well as insoluble in water and in organic solvents.

Applied by roller printing to a cotton fabric is a printing paste of the following composition:

50 pbw of a 32 percent aqueous dispersion of copper phthalocyanine
150 pbw of the above-described 40 percent mixed polymer dispersion
780 pbw of the emulsion thickening agent of Example 2
20 pbw of a 33 percent diammonium phosphate solution 1000 parts by weight Fixing takes place after drying by heating to 150°C for 5 minutes. There is obtained a blue print with soft feel and very good fastness properties.

EXAMPLE 9

A polyester fabric is printed by screen printing with a paste having the following composition:

25 pbw of a 32 percent aqueous dispersion of copper phthalocyanine
100 pbw of the mixed polymer dispersion of Example 8
875 pbw of a gasoline-free thickening agent
1000 parts by weight For the preparation of the gasoline-free thickening agent, 10 pbw of a thickening agent based on polyacrylic acid are distributed into 300 pbw cold water. Then 680 pbw water and subsequently 10 pbw of a 25 percent ammonia solution are added.

Fixing takes place after drying at 150°C for 5 minutes. There is obtained a blue print with good fastness properties.

EXAMPLE 10

A polyester fabric is printed by screen printing with a printing color having the following composition:

25 pbw of a 32 percent aqueous dispersion of copper phthalocyanine
100 pbw of the mixed polymer dispersion of Example 8
875 pbw of a gasoline-free thickening agent 1,000 parts by weight For the preparation of the gasoline-free thickening agent, 100 parts by weight of a 30 percent dispersion of polyacrylic acid and water are distributed into 890 parts by weight water. Subsequently, while stirring, 10 pbw of a 25 percent ammonia solution are added.

After drying, fixing takes place for 5 minutes at 150°C. There is obtained a blue print with good fastness properties.

What is claimed is:

1. A dyed or pigmented fiber or film having the dye or pigment fixed thereto by a fixing agent, said fixing agent being a thermally crosslinked polymer of a linear addition polymer, said linear additional polymer being selected from the group consisting of (1) a linear additional homopolymer of a monomer of the formula $$H - CO - N - CH_2 - NH - CO - C = CH$$
$$\phantom{H - CO - }R^1 \phantom{- CH_2 - NH - CO - }R^2 \phantom{ }R^3$$

wherein $R^1$, $R^2$ and $R^3$ are hydrogen or alkyl having 1 to 5 carbon atoms and (2) a linear addition copolymer containing from about 0.2 to 50 percent by weight of said monomer of said formula and at least one copolymerizable olefinically unsaturated monomer.

2. The dyed or pigmented fiber or film of claim 1 wherein said linear addition polymer is a homopolymer of said monomer.

3. The dye or pigmented fiber or film of claim 1 wherein said linear addition polymer contains from about 0.2 to 50 percent by weight of said monomer and at least one copolymerizable olefinically unsaturated monomer.

4. The dyed or pigmented fiber or film of claim 3 wherein the copolymerizable olefinically unsaturated monomer is selected from the group consisting of vinyl benzenes, α, β-unsaturated mono- and dicarboxylic acids, amides, nitriles and esters of said acids, monoolefins, conjugated diolefins and esters of vinyl alcohols.

5. The dyed or pigmented fiber or film of claim 3 containing about 0.5 to 30 percent by weight of said monomer of said formula.

6. The dyed or pigmented fiber or film of claim 1 wherein each of $R^2$ and $R^3$ is hydrogen or methyl.

* * * * *

UNITED STATES PATENT AND TRADEMARK OFFICE
CERTIFICATE OF CORRECTION

PATENT NO. : 3,924,046
DATED : December 2, 1975
INVENTOR(S) : Joachim Ribka et al It is certified that error appears in the above-identified patent and that said Letters Patent are hereby corrected as shown below:

Left column of the title page, the sixth line of item [75], "Oberurse" should read -- Oberursel --.

Col. 8, line 1, "b.p." should read -- m.p. --.

Signed and Sealed this thirteenth Day of April 1976

[SEAL]

Attest:

RUTH C. MASON
*Attesting Officer*

C. MARSHALL DANN
*Commissioner of Patents and Trademarks*